United States Patent [19]

Udipi

[11] Patent Number: 5,334,635
[45] Date of Patent: Aug. 2, 1994

[54] ANTISTATIC THERMOPLASTIC POLYMERS

[75] Inventor: Kishore Udipi, Longmeadow, Mass.

[73] Assignee: Monsanto Company, St. Louis, Mo.

[21] Appl. No.: 993,274

[22] Filed: Dec. 18, 1992

[51] Int. Cl.$^5$ .................. C08K 5/05; C08L 25/04; C08L 71/02

[52] U.S. Cl. .................. 524/377; 524/388; 524/502; 524/504; 524/910; 524/912; 524/395; 525/187

[58] Field of Search .............. 524/377, 388, 395, 502, 524/504, 910, 912; 525/187

[56] References Cited

U.S. PATENT DOCUMENTS

| | | | |
|---|---|---|---|
| 3,425,981 | 2/1969 | Puletti et al. | 524/910 |
| 4,746,697 | 5/1988 | Yamaguchi et al. | 524/230 |
| 5,077,330 | 12/1991 | Ehrhart et al. | 524/314 |
| 5,151,457 | 9/1992 | Ishida et al. | 524/157 |

FOREIGN PATENT DOCUMENTS 0434011  6/1991  European Pat. Off. ............ 524/910

*Primary Examiner*—James J. Seidleck
*Assistant Examiner*—Thomas Hamilton, III
*Attorney, Agent, or Firm*—William J. Farrington; Mark F. Wachter

[57] ABSTRACT

Antistatic thermoplastic styrenic compositions comprising high molecular weight polyethylene oxide and a lithium salt and ethylene glycol, diethylene glycol or triethylene glycol, characterized by their possession of a balance of mechanical properties, gloss and antistatic behavior.

4 Claims, No Drawings

ANTISTATIC THERMOPLASTIC POLYMERS

ANTISTATIC THERMOPLASTIC POLYMERS

The present invention relates generally to antistatic thermoplastic polymers and more particularly to thermoplastic styrenic polymers containing an antistatic agent which provides rapid electrostatic charge decay.

Styrenic thermoplastic compositions, such as ABS compositions, exhibit an undesirable ready acceptance of electrostatic charge and a relatively slow electrostatic charge dissipation rate making the thermoplastic compositions unacceptable for many applications, such as housing for optical and magnetic recording media, medical devices and military equipment. Electrostatic charge dissipation rates of these compositions can be enhanced by incorporating a hydrophilic, moderately incompatible material possessing antistatic properties into the composition. Such antistatic materials or agents include ethoxylated amine chemicals and homopolymers and copolymers of ethylene oxide, such as polyethylene oxide and epichlorohydrin rubber and are believed to function by continually migrating to the surface of the thermoplastic composition to form a continuous film on the surface because of their limited compatibility with the thermoplastic composition. Moisture is absorbed on the surface of the composition by these antistatic agents thereby enhancing the rate of static charge dissipation.

Unfortunately, the antistatic agents currently known have certain disadvantages. Included among these disadvantages are degradation of the physical and mechanical properties of the thermoplastic composition caused by the antistatic agent; inadequate electrostatic charge dissipation rate; functional dependence on the amount of moisture in the surrounding atmosphere; and loss of antistatic agent from the surface of the thermoplastic composition as a result of wiping, rinsing or aging of the thermoplastic composition or blooming of the agent.

There is therefore a need for styrenic thermoplastic compositions which can be molded into pieces which possess an acceptable balance of mechanical properties and high gloss and do not accept or retain electrostatic charge.

The present invention provides such compositions comprising a styrenic polymer and:

a) from about 1 to about 30 parts by weight of a polyethylene oxide of weight average molecular weight in the range of 100,000 to 4,000,000 per 100 parts by weight of the styrenic polymer b) from about 0.5 to about 15 parts by weight of a glycol per 100 parts by weight of the styrenic polymer, wherein the glycol is represented by the formula $HO(CH_2CH_2O)_n H$ and n is in the range of 1 to 3; and c) from about 0.1 to about 3 parts by weight of a lithium salt per 100 parts by weight of the styrenic polymer;

wherein the weight ratio of the glycol to the polyethylene oxide is in the range of about 0.2 to about 1 and wherein the weight ratio of the lithium salt to the sum of the weight of the polyethylene oxide and the glycol is in the range of about 1:15 to about 1:3.

The styrenic thermoplastic polymeric components include, but are not limited to, polystyrene, styrene-acrylonitrile copolymers, α-methylstyrene-acrylonitrile copolymers, acrylonitrile-butadiene-styrene copolymers, acrylonitrile-butadiene-α-methylstyrene copolymers, acrylonitrile-styrene-acrylate copolymers, methacrylate-butadiene-styrene copolymers, styrene-methyl methacrylate copolymers, and blends thereof and any of such polymers and copolymers blended with compatible rubber compositions such as polystyrene blended with a polybutadiene to which styrene has been grafted, styrene-acrylonitrile copolymer blended with a rubber selected from the group consisting of crosslinked poly-(alkyl acrylate), polybutadiene and ethylene-propylenediene copolymer rubber (EPDM) to which rubber styrene-acrylonitrile copolymer has been grafted, and styrene-methyl methacrylate copolymer blended with a rubber selected from the above group of rubbers to which rubber styrene-methyl methacrylate copolymer has been grafted. Preferred styrenic polymers include styrene-acrylonitrile copolymer, acrylonitrile-butadiene-styrene copolymer and styrene-acrylonitrile copolymer blended with a styrene-acrylonitrile copolymer grafted to a rubber selected from the group consisting of poly(alkyl acrylates) wherein the alkyl group is a $C_3$–$C_{10}$ alkyl, butadiene homo- and copolymers and ethylene-propylene-diene copolymers.

The polyethylene oxides of weight average molecular weight in the range of 100,000 to 4,000,000 are such as may be obtained by polymerization of ethylene oxide, catalyzed by an alkaline earth carbonate such as strontium carbonate. Preferably the molecular weight is in the range of 200,000 to 1,000,000. Suitable polyethylene oxides are sold by Union Carbide Corporation under the "Polyox" registered trademark. The amount of polyethylene oxide in the thermoplastic composition is in the range of 1 to 30 parts by weight per 100 parts by weight of the styrenic polymer. Preferably the amount is in the range of 5 to 20 parts by weight to provide a satisfactory balance of mechanical Properties and antistatic behavior.

The glycol component of the present composition can be selected from any of the following glycols: ethylene glycol, diethylene glycol and triethylene glycol. Ethylene glycol and diethylene glycol are preferred since the lithium salt can be readily dissolved in them to facilitate blending of the antistatic thermoplastic composition. The amount of glycol in the antistatic thermoplastic composition of the present invention is in the range of about 0.5 to about 15 parts by weight per 100 parts by weight of the styrenic polymer and is preferably in the range of about 1 to 10 percent by weight for rapid dissipation of electrostatic charge from the surface of articles molded from the thermoplastic styrenic polymer and reduction in charge acceptance. In order to avoid excessive blooming of the glycol at the surface of the thermoplastic styrenic polymer, the glycol is advantageously limited to a weight ratio in the range of 0.2 to 1 with respect to the polyethylene oxide.

The lithium salt is any salt which is capable of complexing with the glycol or polyethylene oxide and is soluble or dispersible in the glycol/polyethylene oxide components of the thermoplastic composition. Such salts include lithium chloride, lithium bromide, lithium iodide, lithium nitrate, lithium sulfate, lithium acetate, lithium citrate, lithium trifluoromethyl sulfonate and lithium fluorosilicate and their hydrates. Preferred lithium salts are lithium chloride, lithium bromide, lithium iodide and lithium trifluoroinethylsulfonate. To provide satisfactory resistance to electrostatic charge accumulation the concentration of lithium salt is advantageously in the range of about 0.1 to about 3 parts by weight per 100 parts by weight of the styrenic polymer component and the weight ratio to the total weight of the polyethylene oxide and the glycol is advantageously in the range of about 1:15 to about 1:3. Preferably the concentration of lithium salt is in the range of about 0.3 to about 2 parts per 100 parts by weight of the styrenic polymer.

The components of the antistatic styrenic thermoplastic composition may be blended by conventional melt blending techniques, such as mixing in a Banbury mixer or extrusion from a single screw or a double screw extruder where residual water or water from a lithium salt hydrate is flashed off followed by a drying step prior to feeding the blended composition to a pelletizing device. Advantageously the lithium salt is dissolved in the glycol component or in a solution of the polyethylene oxide in the glycol and the lithium solution is then added to other components and blended to provide the antistatic styrenic thermoplastic.

Other known additives, such as impact modifiers, pigments, lubricants, stabilizers, fillers, antioxidants and flow aids may also be included in the antistatic thermoplastic compositions of the present invention provided such additives do not enhance retention of electrostatic charge by the thermoplastic composition or reduce the rate of charge decay to an unsatisfactory level.

In addition to the above description, the antistatic thermoplastic styrenic composition of the present invention is further developed by reference to the illustrative, but not limiting, examples set forth below.

WORKING EXAMPLES

In the Working Examples set forth below, the following components are used:

ABS—a rubber graft copolymer of butadiene and styrene (90/10% by weight) grafted with styrene and acrylonitrile wherein 65% by weight is styrene and 35% by weight is acrylonitrile. This intermediate ABS may be further diluted with a styrene acrylonitrile copolymer.

AAS—a poly(butyl acrylate) rubber grafted with a styrene-acrylonitrile copolymer. The weight ratio of rubber to graft copolymer is 10:12; the weight ratio of styrene to acrylonitrile is 68:32.

AES—an ethylene-propylene-diene rubber grafted with a styrene-acrylonitrile copolymer. The weight ratio of rubber to graft copolymer is 43:57; the weight ratio of styrene to acrylonitrile is 72:28.

SAN—a copolymer of 68% by weight of styrene based on the weight of the copolymer and 32% by weight of acrylonitrile.

PEO [mol. wt.]—polyethylene oxide available from Union Carbide Company. Bracketed number denotes molecular weight.

A-410—ethoxylated alkyl amine antistat sold by Akzo Chemie America under the name Armostat 410.

A-C—a bis-ethylene diamine stearamide sold by Lonza Inc. under the name Acrawax C.

S-160—n-butylbenzyl phthalate sold by Monsanto Company under the name Santicizer-160.

I-1076—a hindered phenol type antioxidant sold by Ciba-Geigy Corp. under the name of Irganox 1076.

STS—sorbitan tristearate.

TP-95—dibutoxyethoxyethyl adipate

SAMPLE PREPARATION

PART 1—COMPOUNDING

The Working Examples set forth below are prepared by compounding using a 3.4 kg. Banbury mixer. All solid intermediates including polymeric components and additives such as antioxidants and flow aids are weighed and dry blended. Lithium salts are dissolved in ethylene glycol or diethylene glycol and the glycol solution is added to the dry blend and mixed in. The blend is then added to the Banbury mixer and extruded as pellets.

Set conditions for the Banbury mixer are as follows:

| | |
|---|---|
| Circulating Oil temperature | 107° C. |
| Rotor Speed | 100 rpm |
| Ram Weight Air Pressure | 0.41–0.55 MPa |
| Post Flux Dump Time | 60–80 sec. |
| Dump Temperature | 216° C. |

The compounded blends are dried thoroughly in a hot air circulating oven at 75° to 80° C. for 24 hours or in a vacuum oven with a nitrogen bleed for 18 hours at the same temperature, prior to being injection molded into test specimens.

Molding is carried out on a 4 oz. Arburg molding machine under the following general conditions:

| | |
|---|---|
| Zone 1 Temp., °C. | 225 |
| Zone 2 | 225 |
| Zone 3 | 230 |
| Nozzle Temp., °C. | 230 |
| Screw Speed, rpm | 200 |
| Injection Pressure, MPa | 7.0 |
| Mold Temp., °C. | 120 |

The freshly molded specimens are conditioned for at least 24 hours at 23° C. and 50% relative humidity unless otherwise stated.

TEST METHODS

The molded specimens and test bars are subjected to the following tests:

Tensile properties ASTM D636;

Flexural properties ASTM D790; (Tensile and Flexural properties are measured on an Instron tester using 0.32 cm. bars.)

Notched Izod Impact—ASTM D256;

HDTUL—ASTM D648 at 0.46 MPa stress;

Vicat softening point—ASTM D1525 applied to samples under 1 Kg load;

Multiaxial Inverted Dart Impact (IDI)—The IDI determination utilized represents a modification of the test described in Society of Plastics Engineers National Technical Conference "Plastics in Surface Transportation" Nov. 12–14, 1974, Detroit, Michigan, at page 238. In the modified test, instead of the dart being attached to the slider and striking the sample, the sample holder is attached to the slider and strikes the instrumented dart. The rotary potentiometer is not used. The instrumented dart used is 1.27 cm. in diameter, and the sample strikes the instrumented dart at a velocity of 140.2 m/min. The samples are injected molded into 7.62 cm. pieces for this test. Results are given in Joules (J).

Surface Gloss—measured using a Gloss Guard 11 device at an angle of 60° C.;

Electrostatic charge and % Charge Decay—a "Static Honest Meter" manufactured by Monroe Electronics, Lyndonville, N.Y. is used to measure electrostatic charge and dissipation of electrostatic charge according to the saturation charged voltage. The surface of the sample, is exposed to corona discharge until it reaches a saturation voltage of 700v. The corona discharge is then stopped and a sensing electrode is used to record the accumulated surface electric charge and its rate of decay. The % charge decay is then calculated from the data obtained at the specified time.

EXAMPLES 1–4 AND COMPARATIVE EXAMPLES C1–C3 provement in notched impact resistance is shown by Examples 1–4 over the comparative examples.

TABLE 1

| Components | Antistatic ABS Compositions |  |  |  |  |  |
|---|---|---|---|---|---|---|
| | Example |  |  |  |  |  |
| (% by weight) | 1 | 2 | 3 | 4 | C-1 | C-2 |
| ABS | 30.6 | 30.3 | 30.5 | 30.5 | 32 | 34.3 |
| SAN | 52 | 52 | 52 | 52 | 53.1 | 63.7 |
| PEO (300K) | 5.25 | 5.25 | 5.15 | 5.25 | 5.25 | — |
| PEO (600K) | 5.25 | 5.25 | 5.15 | 5.15 | 5.25 | — |
| LiBr | 0.5 | 0.8 | 0.8 | 0.8 | 0.8 | — |
| Ethylene Glycol | 2.8 | 2.8 | 2.8 | — | — | — |
| Diethylene glycol | — | — | — | 2.8 | — | — |
| STS | 3 | 3 | 3 | 3 | 3 | — |
| A-C | 0.4 | 0.4 | 0.4 | 0.4 | 0.4 | 0.8 |
| I-1076 | 0.2 | 0.2 | 0.2 | 0.2 | 0.2 | 0.2 |
| A-410 | — | — | — | — | — | 1.0 |

TABLE 2

| Example | Evaluation of ABS Compositions |  |  |  |  |  |  |
|---|---|---|---|---|---|---|---|
| | 1 | 2 | 3 | 4 | C-1 | C-2 | C-3 |
| Tensile Strength (MPa) | 28 | 27 | 26 | 25 | 32 | 52 | 27 |
| Tensile Modulus (GPa) | 2.0 | 1.9 | 2.0 | 2.0 | 2.1 | 2.7 | 2.2 |
| % elongation fail | 15 | 14 | 29 | 13 | 9 | 6 | 30 |
| Flexural Strength (MPa) | 58 | 56 | 57 | 58 | 63 | — | 69 |
| Flexural Modulus (GPa) | 2.3 | 2.3 | 2.3 | 2.3 | 2.3 | 2.7 | 2.4 |
| IDI Emax (J) | 21 | 19 | 17 | 18 | 23 | 5 | 20 |
| IDI Efail (J) | 38 | 35 | 31 | 33 | 45 | 5 | 37 |
| IZOD (⅛") kj/m/m | 39 | 39 | 39 | 39 | 25 | 12 | 9 |
| Deflection temperature under load (kg C.) | 101.8 | 101.4 | 100.9 | 100.1 | 104.0 | 103.0 | 110.0 |
| Gloss 60° | 97 | 97 | 95 | 98 | 96 | — | 97 |
| MFI (g/10 min) 220° C., 10 kg | 18 | 20 | 32 | 34 | 12 | — | 19 |
| Anti-Static Properties |  |  |  |  |  |  |  |
| Surface Resistance (ohms) | 3.80E+10 | 6.00E+08 | 1.30E+09 | 2.82E+09 | 8.20E+11 | 2.00E+15 | 1.10E+12 |
| Static Decay - t ½ | * | * | * | * | 1.0 | ∞ | 2.0 (t ½) |

* Could not measure due to rapid decay
C-2 ABS composition containing A-410
C-3 Toray antistatic ABS: TP 10.

Examples 1 to 4 demonstrate the high gloss and antistatic behavior of ABS compositions within the scope of the invention comprising polyethylene oxides of molecular weights 300k and 600k, ethylene glycol or diethylene glycol and lithium bromide. The compositions are set forth in Table 1 and mechanical properties, gloss and antistatic performance of molded samples are presented in Table 2 in comparison with anABS composition (C-1) without glycol, and commercially available antistatic ABS compositions (C-2) containing Armostat 410 antistat and C-3 an ABS composition sold by Toray under the trade name TP 10. The surface resistance of Examples 1–4 is dependant upon lithium salt concentration and substantially lower than the surface resistance of the comparative examples. comparative Examples C1 and C3 readily accept the saturation voltage which then decays over time. comparative example C-2 shows no appreciable charge decay. In contrast, Examples 1–4 cannot be fully charged and show complete decay of the partial charge within seconds. A substantial im-

EXAMPLES 5–7 AND COMPARATIVE EXAMPLES C2, C3

Examples 5–7 contain polyethylene oxide in a concentration range of 5.1 to 10.3 percent again demonstrating the high gloss and the superior antistatic performance and impact resistance of the antistatic ABS compositions of the invention in comparison with C-2 and C-3.

TABLE 3

| Antistatic ABS compositions; Effect of Polyethylene oxide Concentration |  |  |  |
|---|---|---|---|
| Example | 5 | 6 | 7 |
| ABS | 30.5 | 31.4 | 32.4 |
| SAN | 52 | 53.7 | 55.3 |
| PEO (300k) | 5.15 | 3.86 | 2.57 |
| PEO (600k) | 5.15 | 3.86 | 2.57 |
| LiBr | 0.8 | 0.8 | 0.8 |
| Ethylene Glycol | 2.8 | 2.8 | 2.8 |
| STS | 3 | 3 | 3 |
| A-C | 0.4 | 0.4 | 0.4 |
| I-1076 | 0.2 | 0.2 | 0.2 |

TABLE 4

| ABS Compositions: Effect of Polyethylene Oxide Concentration |  |  |  |  |  |
|---|---|---|---|---|---|
| Example | 5 | 6 | 7 | 4 | C-2 |
| Tensile Strength (MPa) | 27 | 26 | 26 | 44 | 27 |
| Tensile Modulus (GPa) | 2.1 | 2.1 | 2.2 | 2.7 | 2.2 |
| % elongation fail | 26 | 25 | 7 | 6 | 30 |
| Flexural Strength (MPa) | 57 | 57 | 58 | — | 69 |

TABLE 4-continued

ABS Compositions;
Effect of Polyethylene Oxide Concentration

| Example | 5 | 6 | 7 | 4 | C-2 |
|---|---|---|---|---|---|
| Flexural Modulus (GPa) | 2.3 | 2.3 | 2.4 | 2.7 | 2.4 |
| IDI Emax (J) | 20 | 21 | 21 | 5 | 20 |
| IDI Efail (J) | 35 | 41 | 41 | 5 | 37 |
| IZOD ($\frac{1}{8}$") kj/m/m | 43 | 29 | 18 | 12 | 9 |
| Deflection temperature under load (kg C.) | 101.2 | 101.0 | 100.7 | 103.0 | 110.0 |
| Gloss 60 | 97 | 96 | 95 | — | 92 |
| MFI (g/10 min) 220° C., 10 kg | 21 | 24 | 25 | — | 19 |
| Anti-Static Properties | | | | | |
| Surface Resistance (ohms) | 9.21E + 08 | 7.21E + 08 | 2.14E + 10 | 2.00E + 15 | 1.10E + 12 |
| Static Decay - t $\frac{1}{2}$ | * | * | * | ∞ | 2.0 |

* Could not measure due to rapid decay

COMPARATIVE EXAMPLES C-4 AND C-5

ABS Example C-4 is prepared by blending a polyethylene oxide of weight average molecular weight 100,000 and lithium chloride into an ABS-SAN composition. No ethylene glycol or diethylene glycol is included. Comparative Example C-5 is prepared by blending a polyethylene oxide of weight average molecular weight 20,000 and lithium chloride into a similar ABS-SAN composition. The mechanical properties of test pieces molded from example C-4 are satisfactory. Test moldings of Comparative Example C-5 demonstrate incompatibility, the test pieces appearing to be laminar and cheesy and easily broken by hand. No further testing is done. The data are presented in Tables 5 and 6.

TABLE 5

ABS Compositions
Effect of Molecular weight of polyethylene Oxide

| | Example | |
|---|---|---|
| Components (% by wt) | C-4 | C-5 |
| ABS | 32.5 | 32 |
| SAN | 60.5 | 55 |
| PEO (100k) | 16.5 | — |
| PEO (20k) | — | 11 |
| LiCl | .5 | 0.5 |
| S-160 | — | 0.4 |
| A-C | — | 0.4 |
| I-1076 | — | 0.2 |

TABLE 6

Evaluation of ABS Compositions
Effect of Molecular Weight of Polyethylene oxide

| Example | C-4 | C-5* |
|---|---|---|
| Tensile Str. (MPa) | 40.7 | — |
| Tensile Mod. (GPa) | 2.57 | — |
| Elongation (%) | 7 | — |
| Flex Strength (MPa) | 66.2 | — |
| Flex Mod. (GPa) | 4 | — |
| IDI Emax (J.) | 7.1 | — |
| Efail (J.) | 8.4 | — |
| Izod. Notched (Ki/m)$^2$ | 7.6 | — |
| HDT (°C.) | 86 | — |
| Vicat 1 Kg. (°C.) | 107 | — |
| % charge Decay at T = 5s. | 89 | — |

*Sample test pieces are laminar in appearance, cheesy and easily broken by hand.

EXAMPLE 8 AND COMPARATIVE EXAMPLE C-6

Example 8 demonstrates the antistatic behavior of a polyblend comprising AAS, AES and a styrene-acrylonitrile copolymer into which polyethylene oxide, ethylene glycol and lithium bromide has been mixed using a 1 inch Killion single screw extruder operated at 205° C. and 80 rpm. The polyblend has a low surface resistivity, accepts only a fraction of the saturation charge in the test of its antistatic behavior and shows fast decay of the fractional charge. The gloss, impact resistance and antistatic behavior of the polyblend are superior to the polyblend of comparative Example C-6 which contains none of the antistatic ingredients. The formulations and test data are presented in Tables 7 and 8.

TABLE 7

Antistatic AAS/AES/SAN Blend

| | Example | |
|---|---|---|
| Components (% by weight) | 8 | C-6 |
| AAS | 28.1 | 32.6 |
| AES | 16.9 | 19.6 |
| SAN | 39.3 | 45.8 |
| PEO (300k) | 5.15 | — |
| PEO (600k) | 5.15 | — |
| LiBr | 0.8 | — |
| Ethylene Glycol | 2.8 | — |
| TP-95 | 1.7 | 1.9 |
| Dow corning Silicone 200 | 0.1 | 0.1 |

TABLE 8

Evaluation of AAS/AES/SAN Blends

| Example | 8 | C-6 |
|---|---|---|
| Tensile Strength (MPa) | 19.7 | 40.0 |
| Tensile Modulus (GPa) | 1.5 | 2.0 |
| % Elongation (fail) | 29 | — |
| Flexural Strength (MPa) | 37.2 | 57.9 |
| Flexural Modulus (GPa) | 1.6 | 1.8 |
| IDI E max (J) | 19 | 16.3 |
| IDI E fail (J) | 28 | 27.1 |
| Izod ($\frac{1}{8}$") KJ/m$^2$ | 48.5 | 34.7 |
| Gloss 60° | 91 | 95 |
| Surface Resistivity (ohms) | 9.2 × 10$^8$ | 2.7 × 10$^{15}$ |
| Static Decay | * | |

* Could not be measured because of rapid decay.

I claim:

1. An antistatic thermoplastic styrenic polymer composition consisting essentially of a styrenic polymer selected from the group consisting of styrene-acrylonitrile copolymer, α-methylstyrene-acrlonitrile copolymer, acrylonitrile-butadiene-styrene copolymer, acrylonitrile-butadiene-α-methylstyrene copolymer, styrene-acrylonitrile copolymer blended with a poly)C$_3$ to C$_{10}$ alkyl acrylate) rubber grafted with a styrene-acrylonitrile copolymer, styrene-acrylonitrile copolymer blended with a polybutadiene rubber grafted with a styrene-acrylonitrile copolymer, and styrene-acrylonitrile copolymer blended with an ethylene-propylenediene copolymer rubber grafted with a styrene-acrylonitrile copolymer, and a) from about 1 to about 30 parts by weight of a polyethylene oxide of weight average molecular weight in the range of 100,000 to 4,000,000 per 100 parts by weight of the styrenic polymer;

b) from about 0.5 to about 15 parts by weight of a glycol per 100 parts by weight of the styrenic polymer wherein the glycol is represented by the formula $HO(CH_2CH_2O)_nH$ and n is in the range of 1 to 3; and c) from about 0.1 to about 3 parts by weight of a lithium salt per 100 parts by weight of the styrenic polymer; wherein the weight ratio of the glycol to the polyethylene oxide is in the range of about 0.2 to about 1, wherein the lithium salt is selected from the group consisting of lithium chloride, lithium bromide, lithium iodide, lithium nitrate, lithium sulfate, lithium acetate, lithium citrate, lithium fluorosilicate, and the hydrates of these salts, and wherein the weight ratio of the lithium salt to the sum of the weight of the polyethylene oxide and the glycol is in the range of about 1:15 to about 1:3.

2. The antistatic thermoplastic styrenic polymer composition of claim 1 wherein the styrenic polymer is selected from the group consisting of styrene-acrylonitrile copolymer, acrylonitrile-butadiene-styrene copolymer, styrene-acrylonitrile copolymer blended with a polybutadiene grafted with a styrene-acrylonitrile copolymer, styrene-acrylonitrile copolymer blended with a poly($C_3$ to $C_{10}$ alkyl acrylate) rubber grafted with a styrene-acrylonitrile copolymer and styrene-acrylonitrile copolymer blended with an ethylene-propylene-diene copolymer rubber grafted with a styreneacrylonitrile copolymer.

3. The antistatic thermoplastic styrenic polymer composition of claim 1 wherein the polyethylene oxide has a weight average molecular weight in the range of 200,000 to 1,000,000.

4. The antistatic thermoplastic styrenic polymer composition of claim 2 wherein the polyethylene oxide has a weight average molecular weight in the range of 200,000 to 1,000,000 and wherein the lithium salt is selected from the group consisting of lithium chloride, lithium bromide and lithium iodide.

* * * * *